Dec. 17, 1968

M. E. BRICKER 3,416,583

VEGETABLE CUTTER APPARATUS

Filed May 10, 1966

INVENTOR.
MELVIN E. BRICKER
BY
Schmieding & Fultz
ATTORNEYS

Dec. 17, 1968   M. E. BRICKER   3,416,583
VEGETABLE CUTTER APPARATUS
Filed May 10, 1966   4 Sheets-Sheet 2
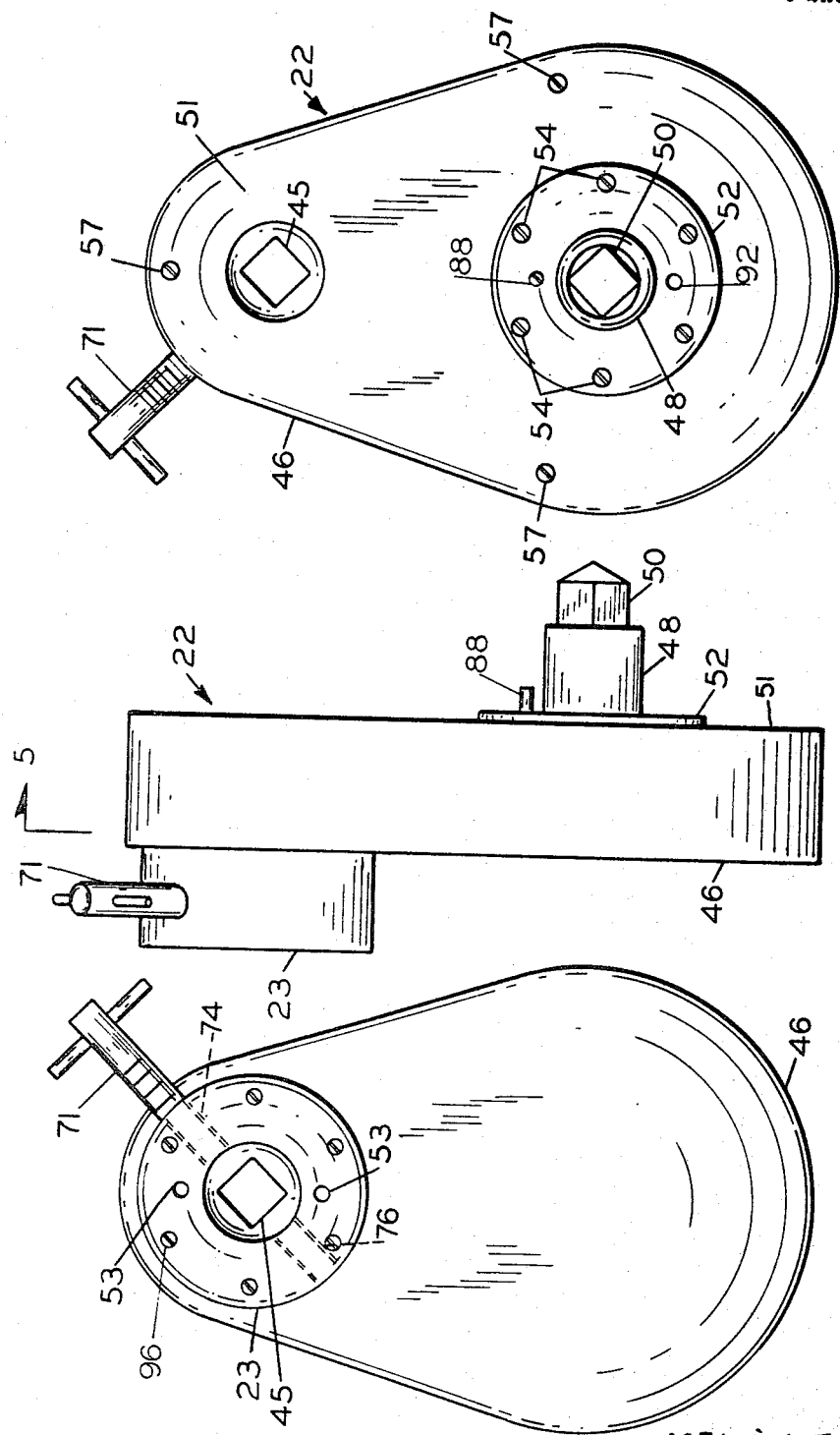
INVENTOR.
MELVIN E. BRICKER
BY
Schmieding & Fultz
ATTORNEYS Dec. 17, 1968  M. E. BRICKER  3,416,583
VEGETABLE CUTTER APPARATUS Filed May 10, 1966  4 Sheets-Sheet 3

INVENTOR.
MELVIN E. BRICKER
BY
Schmieding & Fultz
ATTORNEYS

Dec. 17, 1968  M. E. BRICKER  3,416,583
VEGETABLE CUTTER APPARATUS
Filed May 10, 1966  4 Sheets-Sheet 4
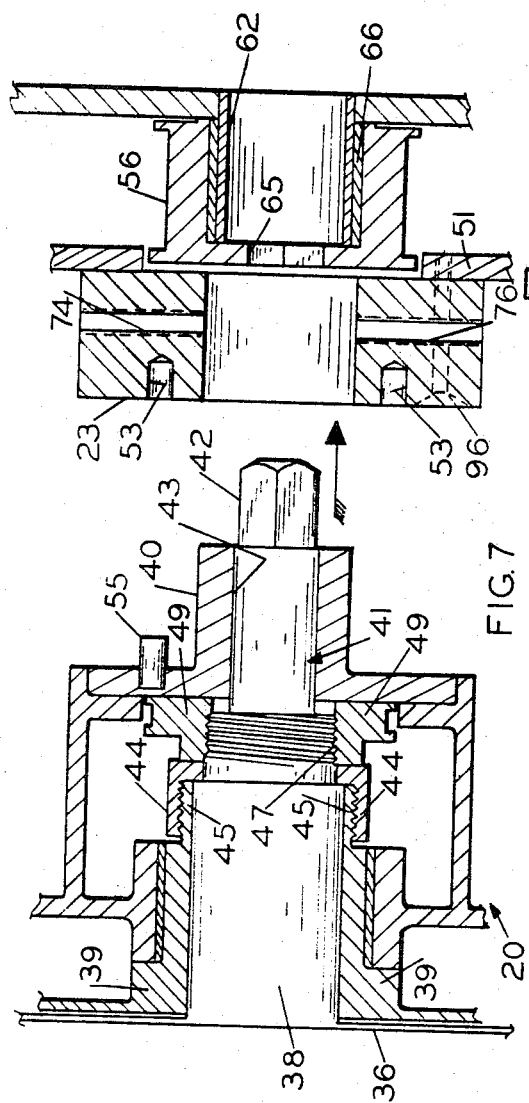
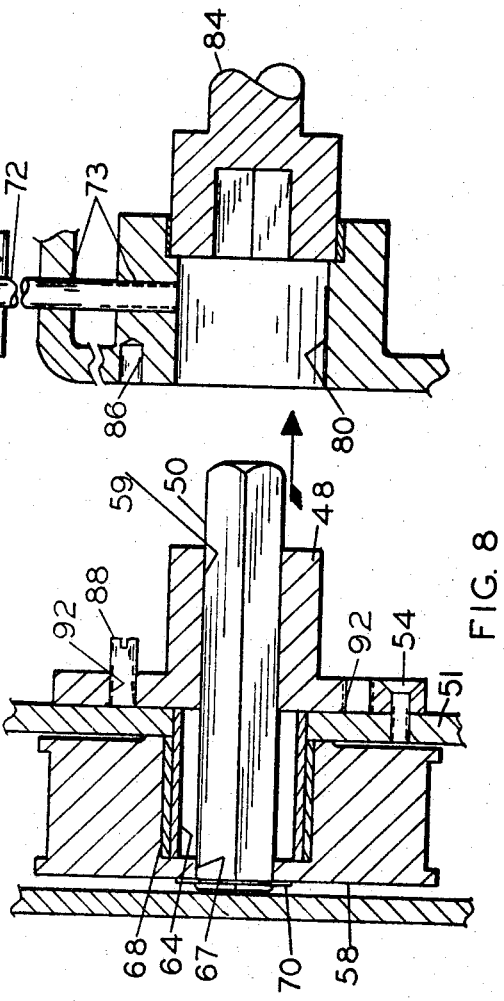
INVENTOR.
MELVIN E. BRICKER
BY
Schmieding & Fultz
ATTORNEYS

United States Patent Office 3,416,583
Patented Dec. 17, 1968

3,416,583
VEGETABLE CUTTER APPARATUS
Melvin E. Bricker, 2723 Saddleback Drive,
Cincinnati, Ohio 45244
Filed May 10, 1966, Ser. No. 548,988
14 Claims. (Cl. 146—115)

The present invention relates generally to food cutters and particularly to a high speed vegetable cutter attachment adapted to fit the power take-off hub available on standard commercial mixers, food cutters, or meat choppers and the like.

In general, the high speed vegetable cutter attachment of the present invention comprises a vegetable cutter portion and a high speed attachment portion provided with a shaft means adapted to fit the power take-off hub of a low speed food cutter for example, and a hub adapted to fit the shaft means of the vegetable cutter portion. Gear means are provided within the high speed attachment which are operatively connected between the shaft means to multiply the revolutions delivered by the power take-off hub. The high speed attachment is adapted so that it may be indexed to lower or raise the vegetable cutter portion depending upon the type of food machine and the original height of the power take-off hub.

In the commercial preparation of foods in restaurants, cafeterias, and the like, the preparation of salads, or cole slaw, for example, present a problem in that the volume generally is not great enough to warrant the purchase of a separate machine adapted just for that purpose. A rather unsatisfactory solution is offered by providing a power take-off hub on some types of food machines, such as mixers, food cutters, meat choppers and the like, one or more of which are usually found in establishments which commercially prepare food. This power take-off hub is adapted to fit certain attachments such as, for example, dicers, slicers, or shredders.

However, these machines which are provided with power take-off hubs, because of the nature of their purpose, are constructed such that the output of revolutions per minute is relatively low. Therefore when the accessory attachments presently in use are connected to these power take-off hubs, the speed at which the cutters operate is very low. The preparation of the vegetables is therefore necessarily time consuming. Since labor costs are relatively high and the future prospects indicate that such costs will continue to rise, there is a real need for a high speed vegetable cutter attachment which is of relatively low cost and which offers a solution to the aforementioned problem.

In accordance with the vegetable cutter attachment of the present invention, the novel construction permits the user to use the power take-off hub of a standard low speed food machine to operate a high speed vegetable cutter.

As another aspect of the present invention the novel construction of the high speed adapter portion permits indexing to raise or lower the position of the vegetable cutter portion relative to the position of the power take-off hub of the food machine.

As another aspect of the present invention, the high speed vegetable cutter attachment provides a relatively low cost accessory which may be used with an existing machine to not only save labor costs but further increases the convenience and ease of operation as compared with prior methods and means.

As another aspect of the present invention, the high speed vegetable cutter attachment includes a novel drive assembly wherein all the drive components are mounted on a common removable housing portion whereby the drive components and housing portion can be removed from the apparatus as an assembly. This greatly facilitates fabrication and maintenance.

It is therefore an object of the present invention to provide an apparatus of the type described which performs high speed vegetable cutting operations when powered by the low speed power take-off hub of a standard food machine.

It is another object of the present invention to provide an apparatus of the type described which permits more convenient and efficient operation by the user as it may be selectively attached in a comfortable operating position.

It is another object of the present invention to provide an apparatus of the type described which may be manufactured and fabricated at low cost.

It is another object of the present invention to provide an apparatus of the type described that can be easily assembled and disassembled with all the drive components mounted in assembled relationship on a common housing portion.

Further objects and advantages of the present invention will be apparent from the following description, reference being had to the accompanying drawings wherein a preferred from of embodiment of the invention is clearly shown.

In the drawings

FIG. 2 is a front elevational view of the high speed adapter portion which comprises a portion of the present invention, the adapter portion being shown isolated from the remainder of the structure;

FIG. 3 is a bottom plan view of the high speed portions shown in FIG. 2.

FIG. 4 is a rear elevational view of the high speed adapter portion shown in FIG. 2;

FIG. 7 is an exploded side elevational view in section of a portion of the apparatus shown in FIG. 1, illustrating in detail the construction of the vegetable cutter driven shaft and the hub of the high speed adapter portion;

FIG. 8 is an exploded side elevational view in section of a portion of the apparatus shown in FIG. 1, illustrating the construction of the larger gear and driven shaft of the high speed adapter portion and the power take-off hub of the food machine.

Figure 1:
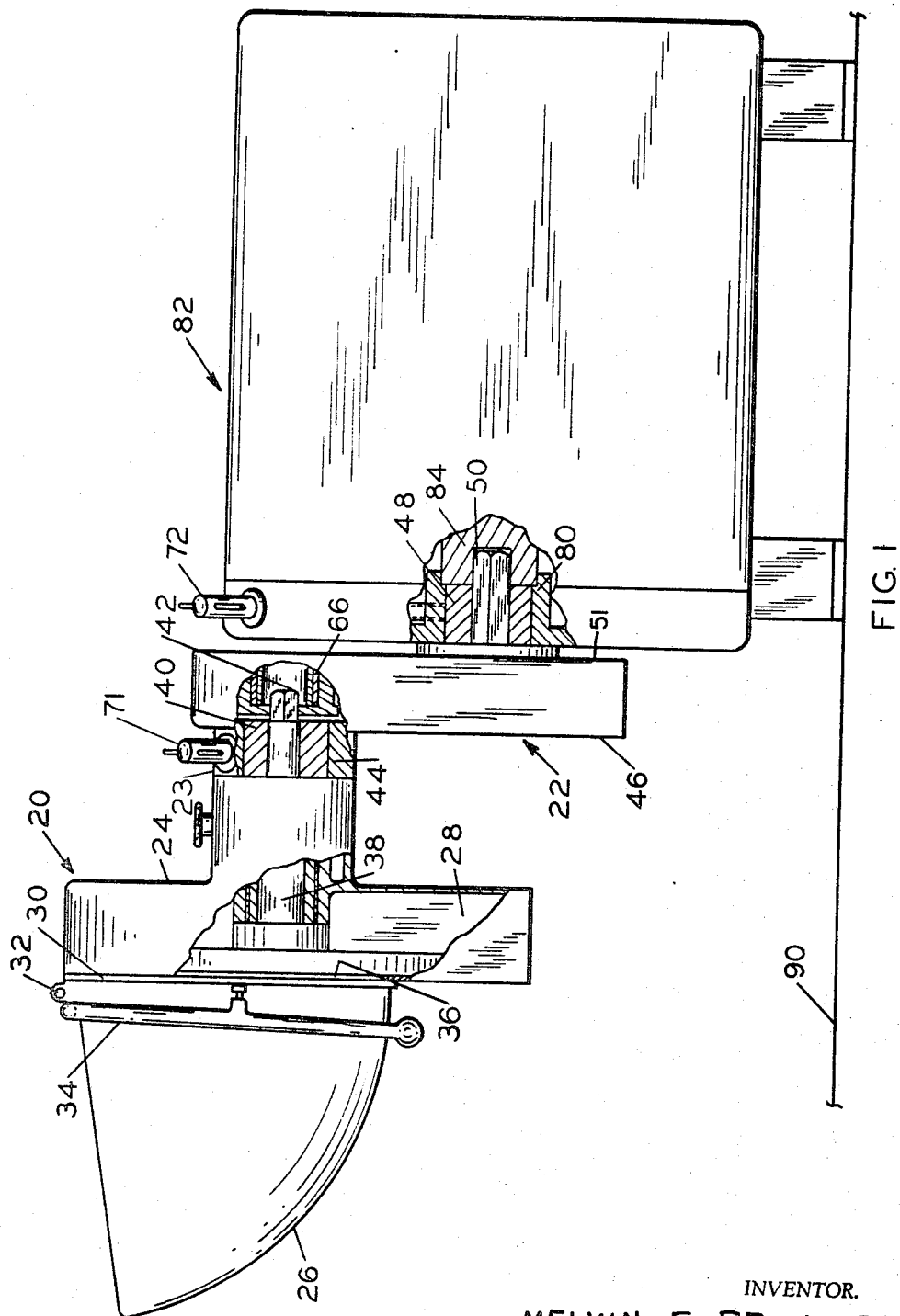
FIG. 1 is a side elevational view partially in section of a high speed vegetable cutter attachment constructed in accordance with the present invention, the attachment being shown mounted on a conventional meat chopper which is provided with a power take-off hub.

Referring in detail to the drawings a high speed vegetable cutter attachment is illustrated in FIG. 1 and includes a vegetable cutter portion, indicated generally at 20 and a high speed adapter portion indicated generally at 22.

Vegetable cutter portion 20, is shown in the form of a vegetable slicer and includes a housing 24, a hopper inlet 26 and an outlet passage 28 which leads to an opening, not shown, in the bottom of housing 24.

A guard plate 30 is pivoted to housing 24 by pivot pin 32 and is manually manipulated by a handle 34 which is rigidly attached to plate 30.

As best seen in FIG. 7, a cutting means in the form of a slicer plate 36 is mounted on or otherwise operatively connected to one end of a shaft 38 which is rotatably mounted in a housing bearing member 39. Inlet 26 and outlet 28 are disposed on opposite sides of cutting means 36. Shaft 38 includes an outer cylindrical male member or end 42 having a square cross section which is rotatably mounted in a bearing member, indicated generally at 41, which is mounted in a bore 43 provided in a boss 40.

As best seen in FIG. 7, bearing member 41 includes a female threaded portion 44, which is adjustably fastened to a male threaded portion 45 provided in housing bearing member 39, and another threaded portion 47 which receives a spacer collar 49.

Referring to FIGS. 1, 3, 4, and 8 high speed adapter portion 22 includes a hub 23 which is removably mounted on elongated housing 46, by means of fasteners 96 and a driven shaft 50 rotatably mounted through a bore 59 provided in a boss 48. Shaft 50 has a square cross sectional configuration. Hub 23 includes a recess adapted to receive boss 40.

Housing 46 is provided with a removably mounted side wall 51, FIG. 2, which is fastened by fasteners 57 to the remainder of the housing thereby providing convenient access to the inner portions of adapter portion 22 if repair or maintenance becomes necessary.

Again referring to FIG. 7, hub 23 includes a pair of pin holes 53, either of which removably receive a pin 55 provided on housing 20 to aid in preventing rotation between cutter portion 20 and adapter portion 22.

It should be noted that hub 23 may be easily removed and a similar hub of different dimensions attached in its place if a different sized vegetable cutter portion is to be used without changing the remainder of adapter portion 22.

Figure 5:
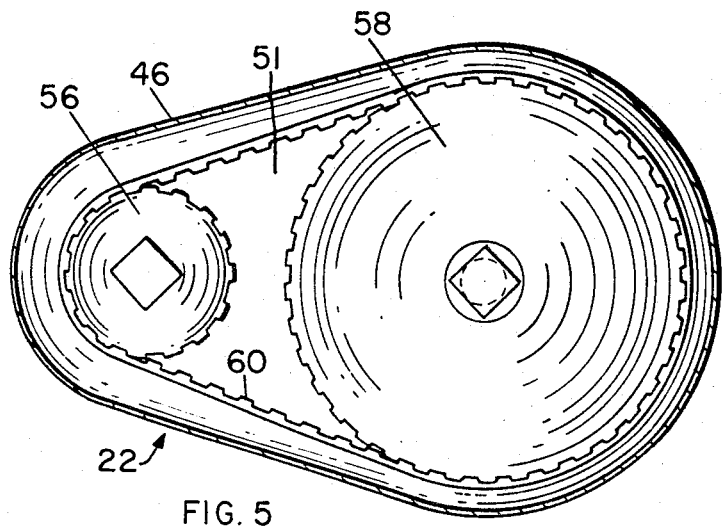
FIG. 5 is a front elevational view in section of the high speed adapter portion shown in FIG. 2, the section being taken along line 5—5 in FIG. 3.

Referring specifically to FIGS. 5, 7, and 8, gear means in the form of pulleys 56 and 58 are operatively connected by a belt drive 60 and each of such rotary members are rotatably mounted within housing 46 on respecive hollow bearing members 62 and 64. The smaller pulley 56 includes a collar or bushing 66 which is rotatably mounted on bearing member 62 and is provided with a square hole 65 adapted to receive the outer end 42 of shaft 38 for detachably connecting pulley to shaft 56 to 38.

The larger pulley 58 includes a collar or bushing 68 which is rotatably mounted on hollow bearing member 64 and is provided with a square hole 67 which is adapted to receive the inner end of shaft 50 for operative connection to pulley 58.

Shaft 50 is rotatably mounted through housing 46 and extends through hollow bearing 64 and square hole 67. The inner end of shaft 50 is retained in pulley 58 by a snap ring 70.

Boss 48 includes an integrally formed flange 52 which is removably fastened to housing 46 by fasteners 54. Flange 52 is removable so that it can readily be changed to fit other types of meat choppers, food cutters, mixers and power units. Shaft 50 is also removable so that another similar shaft of different dimensions may be used in its place if necessary for other types of food machines.

Flange 52 includes a pair of diametrically disposed threaded bores 92, either of which are adapted to receive a threaded pin 88.

Boss 48 and shaft 50 are adapted to fit into a standard power take-off hub 80 which is provided on many conventional relatively slow speed food machines such as for example, the Hobart meat chopper model 4812, indicated generally at 82.

Hub 80 receives boss 48 and provides access to a power take-off drive shaft 84 adapted to receive shaft 50. Flange 52 also functions as a spacer between housing 46 and food chopper 82.

A pin hole 86 is provided in food chopper 82 for receiving pin 88 disposed to prevent rotation of adapter portion 22 relative to food chopper.

A set screw 72 and a threaded bore 73 are provided in the housing of food machine 82 to lock the engagement between boss 48 and hub 80.

It is important to point out that in addition to providing high speed operation, high speed adapter portion 22 of the present invention may be easily indexed to lower or raise cutter portion 20 with respect to hub 80. This permits such an attachment to be practical to the users as it may then be used in comfort regardless of the type or the construction of the food machine which furnishes the power take-off hub 80.

As shown in FIG. 1, cutter portion 20 is raised with respect to hub 80 which is provided on the aforementioned food chopper 82. By the nature of food chopper 82, hub 80 is disposed rather low to table top or stand 90. If cutter portion 20 is not disposed in a raised position, very little room would be afforded between the outlet in the bottom of housing 24 and table top 90 for a receptacle to receive the vegetables that are sliced. If one is unable to selectively position cutter portion 20, the whole apparatus must be moved to the edge of a table or a very low receptacle must be used which would necessitate frequent emptying and replacement.

Figure 6:
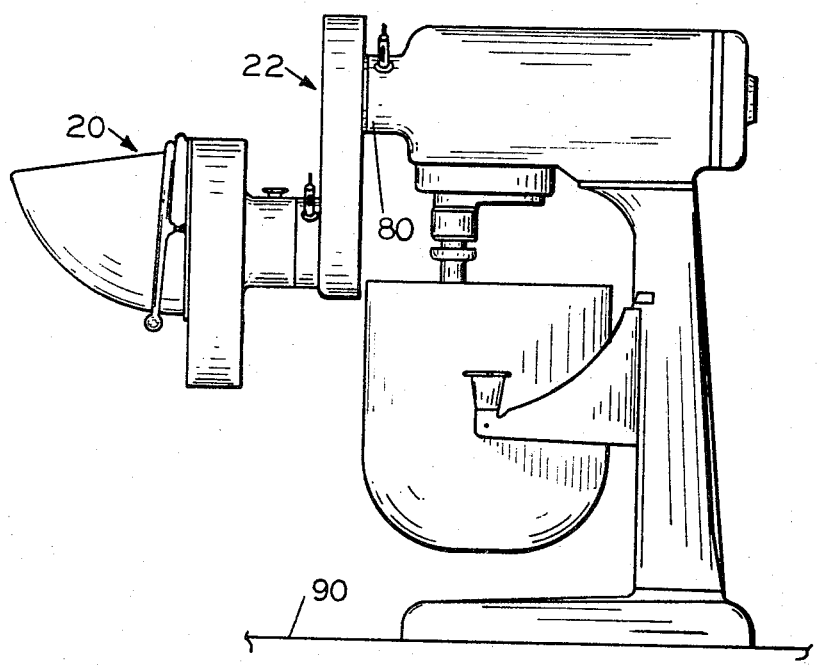
FIG. 6 is a side elevational view of the high speed vegetable cutter attachment of the present invention, the attachment being shown mounted on the power take-off hub of a conventional commercial mixer and indexed 180 degrees to a lower position as compared to the view shown in FIG. 1.

On the other hand other food machines are constructed such that the power take-off hub 80 is disposed in a relatively high position. Such a machine is for example a commercial mixer shown generally in FIG. 6, which is also manufactured by the Hobart Manufacturing Co.

In this situation, the high speed vegetable cutter attachment of the present invention may be indexed 180 degrees to lower cutter portion 20. This provides easy access to the user, especially in the case of women who are often employed in the kitchens of eating establishments. Without this lowering of cutter portion 20 a relatively short man or a woman would experience much difficulty and inconvenience in the operation of the cutter portion 20.

In operation, the user simply inserts shaft 50 into the power take-off hub 80 provided on a standard food machine 82. Then he manipulates a set screw 72 which is provided on food machine 82 to secure the engagement between boss 48 and hub 80. Pin 88 which must be previously threadably inserted into one of the bores 92 is received by pin hole 86. Pin 88 may be easily removed from one bore 92 and placed in the other bore 92 depending on the indexing of adapter portion 22.

Then vegetable cutter portion 20 is attached to adapter portion 22 by inserting boss 40 and the outer end 42 of shaft 38 into hub 23. Outer end 42 is received by square hole 65 and pin 55 is received by the appropriately aligned pin hole 53.

A set screw or threaded fastener 71 is disposed in a threaded bore 74 which is provided in hub 23. Another threaded bore 76 is diametrically opposed to bore 74 and may be used in the alternative to facilitate the turning of set screw 71 when adapter portion 22 is indexed 180 degrees from the position shown in FIG. 1.

Set screw 71 is turned until the inner end frictionally engages boss 40 to prevent the removal of boss 40 from and which locks boss 40 to hub 23.

The user then turns on the food chopper 82 and pivots guard plate 30 upwardly. The vegetables to be sliced are placed in hopper 26 and handle 34 is urged downwardly to force guard plate 30 against the vegetables and hence the vegetables into contact with cutter means 36.

The importance of the proper height of cutter portion 20 is readily apparent here because if cutter portion 20 is disposed too high for the operator, the manipulation of handle 34 to effectively apply downward force becomes very difficult and awkward.

However, indexing cutter portion 20 to the proper position relieves this problem. The vegetables sliced by cutting means 36 pass into outlet passage 28 and wall out of an opening, not shown, in the bottom of housing 24. When the slicing is finished the attachment may be easily removed or left in place to be used again in the near future.

To index the cutter portion 20, pin 88 must first be removed and replaced in the opposite bore 92 so as to be received by pin hole 86. The same procedure as described above then is followed.

It is important to point out that the gearing ratio of pulleys 56 and 58 must not be so high that the motor provided in the food machine having the power take-off will stall. Although other ratios may be used without departing from the spirit of the invention, it has been found that a ratio of approximately 2.53 to 2.87 works very well in most of the standard food machines presently in use.

While the form of embodiment of the present invention as herein disclosed constitutes a preferred form, it is to be understood that other forms might be adopted, all coming within the scope of the claims which follow.

I claim:

1. A high speed cutter attachment for a power take-off hub of a food machine comprising, in combination a cutter portion provided with a driven shaft, cutting means operatively connected to said driven shaft and an inlet and an outlet disposed on opposite sides of said cutting means; and a high speed adapter portion including a housing provided with a boss for insertion into detachable mounted relationship with said power take-off hub, a first rotary member in said housing, a second rotary member in said housing and detachably connectable to said driven shaft of said cutter portion whereby said high speed adapter portion can be detachably mounted between said power take-off hub and said cutter portion, and means operatively connecting said rotary members for increasing the revolutions per minute delivered by said power take-off hub to said cutter portion.

2. The apparatus defined in claim 1 wherein said high-speed adapter portion is adapted for selective positioning of said cutter portion in either a raised or lowered configuration with respect to said power take-off.

3. A high speed cutter attachment for a power take-off hub of a food machine comprising, in combination, a cutter portion including a first housing and a first driven shaft, cutting means operatively connected to one end of said first driven shaft and an inlet and an outlet disposed on opposite sides of said cutting means, said first driven shaft being rotatably extended through a cylindrical male member provided on said housing; a high speed adapter portion including a second housing, a second driven shaft rotatably mounted in said housing and having an outer end adapted for removable insertion into said power take-off hub, a hub spaced from said second driven shaft and adapted to removably receive said cylindrical male member of said first housing; and gear means rotatably mounted in said second housing including a first gear operatively connected to said second driven shaft and a second gear smaller than said first gear operatively connected to said first driven shaft, said second gear being driven by said first gear.

4. The apparatus defined in claim 3 including locking means for lockin said cylindrical male member of said first housing in said hub of said adapter portion.

5. The apparatus defined in claim 3 wherein said second housing has an elongated configuration and is provided with at least one removably mounted side wall.

6. The apparatus defined in claim 3 wherein said hub of said adapter portion includes a pair of diametrically opposed threaded bores and a threaded fastener disposed in one of said bores including an inner end for locking engagement with said cylindrical male member provided on said first housing when said male member is disposed in said hub.

7. The apparatus defined in claim 1 wherein said hub is removably mounted to said adapter housing.

8. The apparatus defined in claim 3 wherein said hub is removably mounted to said adapter housing.

9. A high speed vegetable cutter attachment for a power take-off hub of a food machine comprising, in combination. a vegetable cutter portion including a first housing and a first driven shaft, cutting means operatively connected to one end of said shaft and a vegetable intake and a vegetable outlet disposed on opposite sides of said cutting means, said first shaft being rotatably extended through a cylindrical male member provided on said housing; a high speed adapter portion including a second housing, a boss provided with a bore and removably mounted on said second housing, a second driven shaft rotatably mounted in said second housing and including an outer end extending through said bore of said boss, a hub spaced from said second shaft and removably mounted in said second housing, said hub adapted to removably receive said cylindrical male member on said first housing; and gear means rotatably mounted in said second housing including a first gear operatively connected to said second driven shaft and a second gear smaller than said first gear operatively connected to said first driven shaft and belt means operatively connecting said first gear to said second gear.

10. The apparatus defined in claim 9 wherein said boss includes a pair of diametrically opposed threaded holes and a threaded pin removably mounted in one of said holes.

11. A high speed cutter attachment for a power take-off hub of a food machine comprising, in combination, a cutter portion provide with a first driven shaft and cutting means operated by said first driven shaft; and a high speed adapter portion including a first housing element including a side wall and a second housing element removably joined to said first housing element, a second driven shaft mounted on said side wall and including an inner end disposed within said housing elements and an outer end for connection with said power take-off hub, a rotatable member mounted on said side wall, and a hub element for connecting said rotatable member with said first driven shaft of said cutter portion, said rotatable member being driven by said inner end of the second driven shaft, said second driven shaft and rotatable member being removable as a drive assembly with said first housing element.

12. The apparatus defined in claim 11 wherein said high-speed adapter portion is adapted for selective positioning of said cutter portion in either a raised or lowered configuration with respect to said power take-off hub.

13. The apparatus defined in claim 11 that includes locking means for locking said cutter portion in said hub element of said high speed adapter portion.

14. The apparatus defined in claim 11 wherein the inner end of said second driven shaft includes a first pulley means and said rotatable member includes a second pulley means, said pulley means being drivingly connected by a flexible belt means.

References Cited

UNITED STATES PATENTS

| | | | |
|---|---|---|---|
| 1,879,004 | 9/1932 | Altorfer | 74—16 |
| 1,983,292 | 12/1934 | Hoe | 74—16 |
| 2,730,901 | 1/1956 | Ripple | 74—16 |
| 2,795,958 | 6/1957 | Frank | 74—16 |
| 3,075,564 | 1/1963 | Spilky | 146—115 |
| 3,194,287 | 7/1965 | Meeker | 146—67 |

W. GRAYDON ABERCROMBIES, *Primary Examiner.*

U.S. Cl. X.R.

74—16